2,784,212
Patented Mar. 5, 1957

2,784,212
PRODUCTION OF TEREPHTHALONITRILE

Adalbert Farkas, Jenkintown, Alfred F. D'Alessandro, Havertown, and Rudolph Rosenthal, East Lansdowne, Pa., assignors, by mesne assignments, to Aries Associates, Inc., New York, N. Y., a corporation of New York No Drawing. Application October 18, 1954,
Serial No. 463,058

13 Claims. (Cl. 260—465)

This invention relates to a process for the production of terephthalonitrile by reacting certain oxygenated terpenes with ammonia and oxygen at elevated temperatures in the presence of suitable catalysts.

It is disclosed in our copending application Serial No. 437,588, filed June 17, 1954, that a variety of terpenes which are in abundant supply at a relatively low cost, including turpentine containing a predominant amount of pinenes, can be directly converted to terephthalonitrile of high purity and in good yields by reaction of the terpenes with oxygen and ammonia in the presence of oxidation catalysts. We have now discovered that certain oxygenated terpenes likewise can be directly converted to terephthalonitrile of high purity and in good yields by reaction with oxygen and ammonia in the presence of oxidation catalysts.

The oxygenated terpenes which may be treated in accordance with our invention have the formula $C_{10}H_{18}O$, $C_{10}H_{20}O_2$ or $C_{10}H_{20}O$ and consist of a six-membered ring having attached to the carbon in the 1-position a methyl radical and to the carbon in the 4-position a propane derivative of the group consisting of isopropyl, hydroxy isopropyl, isopropenyl and isopropylidine radicals. The most common examples of these oxygenated compounds are the terpineols, cineols, terpins, terpinenols, menthol, borneol, dihydrocarbeol, piperitol, isopulegol, thujyl alcohol, carbomenthol and dihydro-α-terpineol. The structural formula of these oxygenated derivatives are shown below:

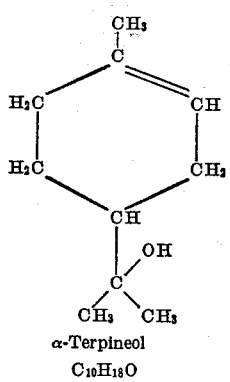

α-Terpineol
$C_{10}H_{18}O$

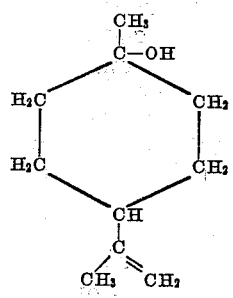

β-Terpineol
$C_{10}H_{18}O$

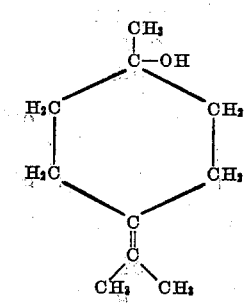

γ-Terpineol
$C_{10}H_{18}O$

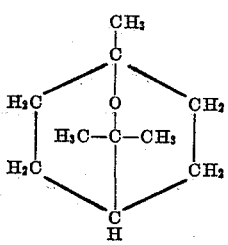

1,8-Cineol
$C_{10}H_{18}O$

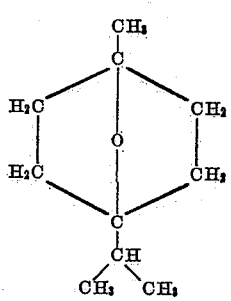

1,4-Cineol
$C_{10}H_{18}O$

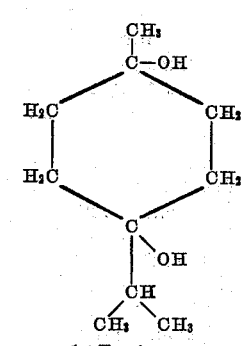

1,4-Terpin
$C_{10}H_{20}O_2$

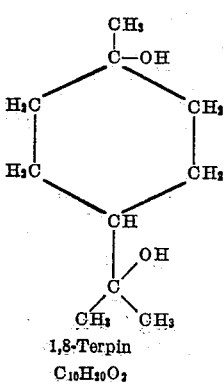

1,8-Terpin
$C_{10}H_{20}O_2$

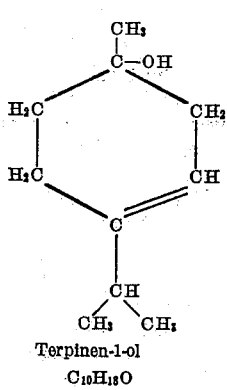

Terpinen-1-ol
$C_{10}H_{18}O$

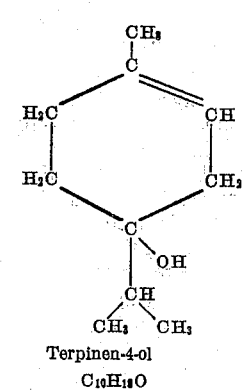

Terpinen-4-ol
$C_{10}H_{18}O$

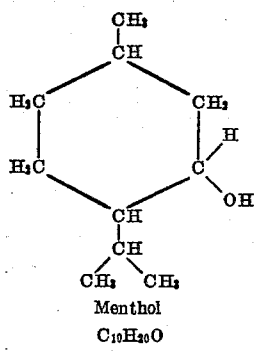
Menthol
C₁₀H₂₀O

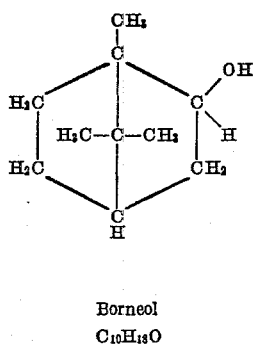
Borneol
C₁₀H₁₈O

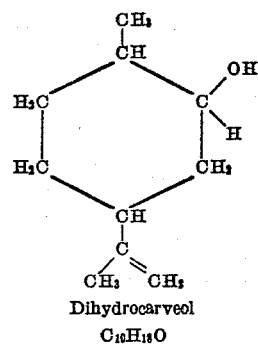
Dihydrocarveol
C₁₀H₁₈O

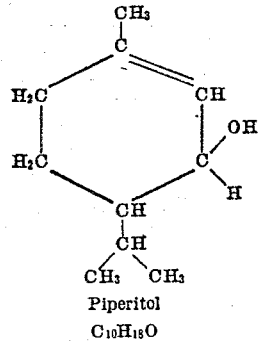
Piperitol
C₁₀H₁₈O

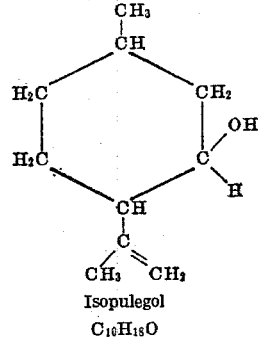
Isopulegol
C₁₀H₁₈O

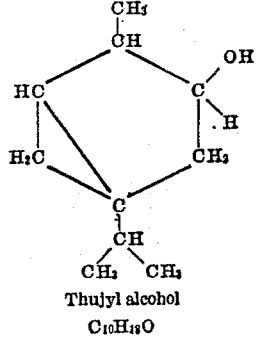
Thujyl alcohol
C₁₀H₁₈O

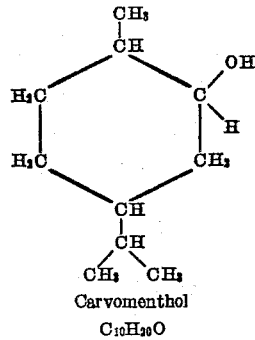
Carvomenthol
C₁₀H₂₀O

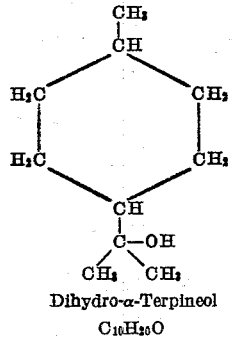
Dihydro-α-Terpineol
C₁₀H₂₀O

In place of ammonia a primary alkyl amine may be used to form the terephthalonitrile of this invention. Any nitrogen compound converted into ammonia at the elevated temperature at which oxidation of the oxygenated terpene reactant is carried out may also be used in place of ammonia. The reaction mixture should contain at least about two mols of ammonia for each mol of oxygenated terpene compound. Especially good yields of terephthalonitrile are obtained by using about 4 to 15 mols of ammonia for each mol of oxygenated terpene compound. When a primary alkyl amine is employed instead of ammonia, the same molecular proportions of amine to oxygenated terpene reactant are used as described above for ammonia.

The oxidizing agent used in the present process is oxygen. Although air is the preferred oxidizing agent, the feed mixture can also be made up with oxygen, oxygen-enriched air or air or oxygen diluted with nitrogen, carbon dioxide, steam or other inert gases.

While the active components of the feed mixture are the oxygenated terpenes, ammonia and oxygen, we have found that by recycling a major portion of the gases leaving the reactor after the terephthalonitrile product has been removed, the ammonia consumption can be appreciably reduced since a considerable amount of the ammonia feed leaves the reactor unchanged. In addition, using this technique, unattacked oxygenated terpene can be returned to the reactor and can be utilized again.

In carrying out the present invention, the oxygenated terpene is mixed with air or other oxygen-containing gas and ammonia in proportion such that the mixture is non-explosive, and the mixture is then passed at temperatures ranging from about 200° to 600° C. in contact with an oxidation catalyst. While the several reaction conditions are related to each other so variations in one condition will permit varying another condition without substantially affecting the results of the process, a representative set of conditions is as follows: passing a reaction mixture containing about 4 to 15 mols ammonia and about 5 to 50 mols of oxygen for every mol of oxygenated terpene reactant over an oxidation catalyst at a temperature of about 300° to 550° C. and a space velocity of 1000 to 5000 cc. of reaction gas (calculated at S. T. P.) per hour per cubic centimeter apparent volume of catalyst.

The catalysts employed in carrying out the process of this invention may be metal oxides which promote the partial oxidation of organic compounds. Preferably the catalysts used are those which promote dehydrogenation of hydrocarbons and their oxidation to oxygen-containing partial oxidation products. Typical among such catalysts are the oxides of vanadium, molybdenum, columbium, chromium, tungsten, uranium, manganese, copper, iron, cobalt and nickel. These metal oxides can be used mixed with each other, with alumina or other materials. Particularly efficient catalysts are those containing an oxide of vanadium and/or molybdenum. The preparation and composition of a few suitable catalysts are described, for example, in U. S. Patents 2,081,272 issued May 25, 1937, 2,180,353 issued November 21, 1939 and 2,294,130 issued August 25, 1942.

Although the catalyst may be employed in the form of a fixed bed, it is preferred to effect the reaction employing the catalyst in a fluidized form. We have found that by use of a fluidized catalyst better control of the reaction is facilitated and maximum conversion and efficiency of the process is realized. The catalyst may be maintained in fluidized form by passing the gaseous reaction mixture through the catalyst bed at gas velocities of 0.02 to one foot per second, while maintaining suitable bed depth of say ½ to 10 feet to maintain the desired space velocity.

While the suitable temperatures will vary somewhat according to the particular catalyst being employed and other operating conditions, in general, the reaction mixture containing the oxygenated terpene reactant, oxygen and ammonia or primary alkyl amine is contacted with the catalyst at temperatures varying from about 200° to 600° C., preferably at about 300° to 550° C.

The contact time defined as the ratio of the catalyst volume to the flow rate of gas (at reaction conditions) is generally within the range of about 0.1 to 10 seconds. Contact time may be varied for any given depth of catalyst bed by adjusting the space velocity of the gaseous reactants.

Some of the oxygenated terpene reactants of the present invention occur in various natural essential oils while others can be prepared by chemical treatment from the terpene hydrocarbons defined in copending application Serial No. 437,588, such as para-menthadienes, thujenes and bornylene. Such chemical treatment can be hydration either alone or combined with hydrogenation, oxidation followed by hydrogenation, or any other process or combination of processes in which the desired oxygenated terpenes are formed.

The oxygenated terpene reactants can be converted to terephthalonitrile either in the pure state or in the form of mixtures with each other, with terpene hydrocarbons or with derivatives of terpene hydrocarbons. This represents an important advantage of the present process since such mixtures occur both in natural essential oils and in the products derived from terpene hydrocarbons by chemical treatment.

Generally speaking, the terephthalonitrile produced by the process of this invention has a purity of at least about 85 percent. If desired or required, the initial product may be further purified by simple sublimation or distillation procedures to produce terephthalonitrile which is, for all intents and purposes, entirely pure.

Terephthalonitrile may be readily hydrolyzed by known methods in substantially quantitative yield to terephthalic acid. Terephthalic acid is useful for making fibers of the polyester type and as raw material for other polymeric products. In addition, terephthalonitrile may be readily converted to terephthalic acid esters valuable as plasticizers for vinyl and other types of resins. Terephthalonitrile may also be used directly in the production of various intermediates, resins and other useful products.

Our invention will be further illustrated by the following examples, in which about atmospheric pressure was used:

*Example 1.*—A gaseous mixture of ammonia, vapors of menthol, air and nitrogen in the proportions of 9.8 mols of ammonia, 0.6 mol of menthol, 58.5 mols of air and 31.1 mols of nitrogen was passed through a fluidized bed of vanadium pentoxide at about 403° C. and at a space velocity of 1,955, which corresponded to a contact time of 0.74 second. The vanadium pentoxide catalyst was prepared by grinding fused vanadium pentoxide containing some alumina and screening to 105–210 micron size. The reaction products were cooled, and a solid material separated out. The solid material was filtered, washed with water and "Skellysolve" (a commercial solvent consisting of hexanes, heptanes, octanes and solvent naphtha) and dried.

The dried solid product had a melting point of 222.8° to 224.8° C. This material was sublimed to give substantially pure terephthalonitrile, whereupon 94.5% of the product was recovered. After sublimation, the product had a melting point of 224.1° to 226.4° C., and its ultraviolet spectrum was identical to that of pure terephthalonitrile. The yield of the sublimed, purified product was 24.7 mol percent based on the menthol fed.

*Example 2.*—A gaseous mixture of ammonia, vapors of 1,8-terpin hydrate, air and nitrogen in the proportions of 9.8 mols of ammonia, 0.4 mol of terpin hydrate, 58.7 mols of air and 31.1 mols of nitrogen was passed through a fluidized bed of the catalyst of Example 1 at about 391° C. and at a space velocity of 1,945, which corresponded to a contact time of 0.76 second.

The dried solid product obtained as in Example 1 had a melting point of 216.5° to 224.4° C. This material was sublimed to give substantially pure terephthalonitrile, whereupon 94.7% of the product was recovered. After sublimation, the product had a melting point of 224° to 226.1° C., and its ultraviolet spectrum was identical to that of pure terephthalonitrile. The yield of the sublimed, purified product was 23.3 mol percent based on the terpin hydrate fed.

*Example 3.*—A gaseous mixture of ammonia, vapors of α-terpineol and air in the proportions of 5.4 mols of ammonia, 0.4 mol of α-terpineol and 94.2 mols of air was passed through a fluidized bed of the catalyst of Example 1 at about 415° C. and at a space velocity of 1,565, which corresponded to a contact time of 0.91 second.

The dried solid product obtained as in Example 1 had a melting point of 200° to 215° C. This material was sublimed to give substantially pure terephthalonitrile, whereupon 85.7% of the product was recovered. After sublimation, the product had a melting point of 223.7° to 226.7° C., and its ultraviolet spectrum was identical to that of pure terephthalonitrile. The yield of the sublimed, purified product was 27.8 mol percent based on the α-terpineol fed.

*Example 4.*—A gaseous mixture of ammonia, vapors of 1,8-cineol, air and nitrogen in the proportions of 9.7 mols of ammonia, 1.0 mol of cineol, 58.2 mols of air and 31.1 mols of nitrogen was passed through a fluidized bed of the catalyst of Example 1 at about 408° C. and at a space velocity of 1,965, which corresponded to a contact time of 0.73 second.

The dried solid product obtained as in Example 1 had a melting point of 208.9° to 221.3° C. This material was sublimed to give substantially pure terephthalonitrile, whereupon 85.3% of the product was recovered. After sublimation, the product had a melting point of 221° to 225.2° C., and its ultraviolet spectrum was identical to that of pure terephthalonitrile. The yield of the sublimed, purified product was 15.8 mol percent based on the cineol fed.

*Example 5.*—A gaseous mixture of ammonia, vapors of 1.8-cineol, air and nitrogen in the proportions of 9.7 mols of ammonia, 1.1 mols of cineol, 58.3 mols of air and 30.9 mols of nitrogen was passed through a fluidized bed of the catalyst of Example 1 at about 399° C. and at a space velocity of 1,770, which corresponded to a contact time of 0.83 second.

The yield of dried solid product obtained as in Example 1 was 50.8 mol percent based on the cineol fed.

*Example 6.*—A gaseous mixture of ammonia, vapors of borneol and air in the proportions of 5.4 mols of ammonia, 0.4 mol of borneol and 94.2 mols of air was passed through a fluidized bed of the catalyst of Example 1 at about 430° C. and at a space velocity of 1,565, which corresponded to a contact time of 0.89 second.

The dried solid product obtained as in Example 1 was sublimed to give substantially pure terephthalonitrile, whereupon 87.7% of the product was recovered. After sublimation, the product had a melting point of 219.5° to 221.5° C., and its ultraviolet spectrum was identical to that of pure terephthalonitrile. The yield of the sublimed, purified product was 3.9 mol percent based on the borneol fed.

*Example 7.*—A gaseous mixture of ammonia, vapors of terpinen-4-ol, air and nitrogen in the proportions of 6.4 mols of ammonia, 0.5 mol of terpinen-4-ol, 52.6 mols of air and 40.5 mols of nitrogen was passed through a fluidized bed of the catalyst of Example 1 at about 460° C. and at a space velocity of 2,195, which corresponded to a contact time of 0.61 second.

The dried solid product obtained as in Example 1 had a melting point of 220.6° to 224.4° C. This material was sublimed to give substantially pure terephthalonitrile, whereupon 71.2% of the product was recovered. After sublimation, the product had a melting point of 225.3° to 225.9° C., and its ultraviolet spectrum was identical to that of pure terephthalonitrile. The yield of the sublimed, purified product was 18.5 mol percent based on the terpinen-4-ol fed.

*Example 8.*—A gaseous mixture of ammonia, vapors of isopulegol, air and nitrogen in the proportions of 6.4 mols of ammonia, 0.5 mol of isopulegol, 52.6 mols of air and 40.5 mols of nitrogen was passed through a fluidized bed of the catalyst of Example 1 at about 430° C. and at a space velocity of 2,195, which corresponded to a contact time of 0.64 second.

The dried solid product obtained as in Example 1 had a melting point of 218.3° to 222.7° C. This material was sublimed to give substantially pure terephthalonitrile, whereupon 88.8% of the product was recovered. After sublimation, the product had a melting point of 218.4 to 223.0° C., and its ultraviolet spectrum was identical to that of pure terephthalonitrile. The yield of the sublimed, purified product was 14.2 mol percent based on the isopulegol fed.

Oxidation catalysts such as columbium oxide, molybdenum oxide, uranium oxide, manganese oxide and others may be substituted for the vanadium pentoxide catalyst used in the above examples to directly obtain good yields of terephthalonitrile of high purity.

While we have described the preferred embodiments for carrying out the process of our invention, it will be apparent that many changes may be made without departing from the spirit of our invention.

We claim:

1. The method of preparing terephthalonitrile which comprises passing a gaseous mixture comprising ammonia, oxygen and a member of the group consisting of oxygenated terpenes having the formula $C_{10}H_{18}O$, oxygenated terpenes having the formula $C_{10}H_{20}O_2$, oxygenated terpenes having the formula $C_{10}H_{20}O$ and mixtures of such oxygenated terpenes, each oxygenated terpene consisting of a six-membered ring having attached to the carbon in the 1-position a methyl radical and to the carbon in the 4-position a propane derivative of the group consisting of isopropyl, hydroxy isopropyl, isopropenyl and isopropylidene radicals, into contact with an oxidation catalyst at a temperature of about 200° to 600° C.

2. The method of preparing terephthalonitrile which comprises passing a gaseous mixture comprising ammonia, oxygen and a mixture of oxygenated terpenes, each of the oxygenated terpenes being a member of the group consisting of oxygenated terpenes having the formula $C_{10}H_{18}O$, oxygenated terpenes having the formula $C_{10}H_{20}O_2$ and oxygenated terpenes having the formula $C_{10}H_{20}O$ and consisting of a six-membered ring having attached to the carbon in the 1-position a methyl radical and to the carbon in the 4-position a propane derivative of the group consisting of isopropyl, hydroxy isopropyl, isopropenyl and isopropylidene radicals, into contact with an oxidation catalyst at a temperature of about 200° to 600° C.

3. The method of preparing terephthalonitrile which comprises passing a gaseous mixture comprising ammonia, oxygen and a mixture of terpene hydrocarbons and oxygenated terpenes, each of the oxygenated terpenes being a member of the group consisting of oxygenated terpenes having the formula $C_{10}H_{18}O$, oxygenated terpenes having the formula $C_{10}H_{20}O_2$ and oxygenated terpenes having the formula $C_{10}H_{20}O$ and consisting of a six-membered ring having attached to the carbon in the 1-position a methyl radical and to the carbon in the 4-position a propane derivative of the group consisting of isopropyl, hydroxy isopropyl, isopropenyl and isopropylidene radicals, into contact with an oxidation catalyst at a temperature of about 200° to 600° C.

4. A method of preparing terephthalonitrile which comprises passing a gaseous mixture comprising ammonia, oxygen and a member of the group consisting of oxygenated terpenes having the formula $C_{10}H_{18}O$, oxygenated terpenes having the formula $C_{10}H_{20}O_2$ and oxygenated terpenes having the formula $C_{10}H_{20}O$ and consisting of a six-membered ring having attached to the carbon in the 1-position a methyl radical and to the carbon in the 4-position a propane derivative of the group consisting of isopropyl, hydroxy isopropyl, isopropenyl and isopropylidene radicals, in the proportion of at least about 2 mols of ammonia and at least about 5 mols of oxygen per mol of oxygenated terpene, into contact with an oxidation catalyst at a temperature of about 200° to 600° C.

5. The process for the production of terephthalonitrile which comprises passing ammonia, oxygen, and a member of the group consisting of oxygenated terpenes having the formula $C_{10}H_{18}O$ and oxygenated terpenes having the formula $C_{10}H_{20}O_2$, each oxygenated terpene consisting of a six-membered ring having attached to the carbon in the 1-position a methyl radical and to the carbon in the 4-position a member of the group consisting of isopropyl hydroxy isopropyl, isopropenyl and isopropylidene radicals, in vapor phase, over a metal oxide organic oxidation catalyst at a temperature of about 300° to 550° C.

6. The method of preparing terephthalonitrile which comprises passing a gaseous mixture comprising ammonia, oxygen and a member of the group consisting of oxygenated terpenes having the formula $C_{10}H_{18}O$, oxygenated terpenes having the formula $C_{10}H_{20}O_2$ and oxygenated terpenes having the formula $C_{10}H_{20}O$ and consisting of a six-membered ring having attached to the carbon in the 1-position a methyl radical and to the carbon in the 4-position a propane derivative of the group consisting of isopropyl, hydroxy isopropyl, isopropenyl and isopropylidene radicals, in the proportions of at least about 2 mols of ammonia and at least about 5 mols of oxygen per mol of oxygenated terpene, into contact with an oxidation catalyst at a temperature of about 300° to 550° C.

7. The method of preparing terephthalonitrile which comprises passing a gaseous mixture comprising ammonia, oxygen and a member of the group consisting of oxygenated terpenes having the formula $C_{10}H_{18}O$, oxygenated terpenes having the formula $C_{10}H_{20}O_2$ and oxygenated terpenes having the formula $C_{10}H_{20}O$ and consisting of a six-membered ring having attached to the carbon in the 1-position a methyl radical and to the carbon in the 4-position a propane derivative of the group consisting of isopropyl, hydroxy isopropyl, isopropenyl and isopropylidene radicals, in the proportions of about 4 to 15 mols of ammonia and about 5 to 50 mols of oxygen per mol of oxygenated terpene, into contact with an oxidation catalyst at a temperature of about 300° to 550° C.

8. The method of preparing terephthalonitrile which comprises passing a gaseous mixture comprising ammonia, oxygen and a cineol, in the proportions of at least about 2 mols of ammonia and at least about 5 mols of oxygen per mol of cineol, into contact with a fluidized oxidation catalyst at a temperature of about 300° to 550° C.

9. The method of preparing terephthalonitrile which comprises passing a gaseous mixture comprising ammonia, oxygen and a terpineol, in the proportions of at least about 2 mols of ammonia and at least about 5 mols of oxygen per mol of terpineol, into contact with a fluidized oxidation catalyst at a temperature of about 300° to 550° C.

10. The method of preparing terephthalonitrile which comprises passing a gaseous mixture comprising ammonia, oxygen and menthol, in the proportions of at least about 2 mols of ammonia and at least about 5 mols of oxygen per mol of menthol, into contact with a fluidized oxidation catalyst at a temperature of about 300° to 550° C.

11. The method of preparing terephthalonitrile which comprises passing a gaseous mixture comprising ammonia, oxygen and a cineol, in the proportions of about 4 to 15 mols of ammonia and about 5 to 50 mols of oxygen per mol of cineol, into contact with a fluidized oxidation catalyst at a temperature of about 300° to 550° C.

12. The method of preparing terephthalonitrile which comprises passing a gaseous mixture comprising ammonia, oxygen and a terpineol, in the proportions of about 4 to 15 mols of ammonia and about 5 to 50 mols of oxygen per mol of terpineol, into contact with a fluidized oxidation catalyst at a temperature of about 300° to 550° C.

13. The methd of preparing terephthalonitrile which comprises passing a gaseous mixture comprising ammonia, oxygen and menthol, in the proportions of about 4 to 15 mols of ammonia and about 5 to 50 mols of oxygen per mol of menthol, into contact with a fluidized oxidation catalyst at a temperature of about 300° to 550° C.

References Cited in the file of this patent

UNITED STATES PATENTS

| | | |
|---|---|---|
| 2,486,934 | Erchak | Nov. 1, 1949 |
| 2,499,055 | Cosby et al. | Feb. 28, 1950 |